(12) United States Patent
Plotts et al.

(10) Patent No.: US 7,243,042 B2
(45) Date of Patent: Jul. 10, 2007

(54) ENGINE COMPONENT LIFE MONITORING SYSTEM AND METHOD FOR DETERMINING REMAINING USEFUL COMPONENT LIFE

(75) Inventors: Kurt Augustus Plotts, Oviedo, FL (US); Fredrick Michael Davis, Orlando, FL (US); Christina Leanne Peronto, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 198 days.

(21) Appl. No.: 10/999,663

(22) Filed: Nov. 30, 2004

(65) Prior Publication Data

US 2006/0116847 A1    Jun. 1, 2006

(51) Int. Cl.
*G01K 17/00*    (2006.01)
(52) U.S. Cl. .................. 702/136; 702/34; 700/287
(58) Field of Classification Search .............. None
See application file for complete search history.

(56) References Cited

U.S. PATENT DOCUMENTS

| | | | | |
|---|---|---|---|---|
| 4,875,170 | A * | 10/1989 | Sakurai et al. | 702/34 |
| 5,447,059 | A * | 9/1995 | Miller et al. | 73/116 |
| 5,455,777 | A * | 10/1995 | Fujiyama et al. | 702/34 |
| 5,881,971 | A | 3/1999 | Hickman | |
| 6,405,108 | B1 * | 6/2002 | Patel et al. | 701/29 |
| 6,499,114 | B1 | 12/2002 | Almstead et al. | |
| 6,505,143 | B1 * | 1/2003 | Lakshminarasimha et al. | 702/183 |
| 6,532,421 | B2 * | 3/2003 | Miwa | 702/34 |
| 6,556,956 | B1 | 4/2003 | Hunt | |
| 6,587,754 | B2 | 7/2003 | Hung et al. | |
| 6,772,051 | B2 * | 8/2004 | Nagafuchi et al. | 700/287 |
| 6,801,871 | B2 * | 10/2004 | Ishii et al. | 702/136 |
| 6,853,930 | B2 * | 2/2005 | Hayashi et al. | 702/61 |
| 6,907,320 | B2 * | 6/2005 | Nagafuchi et al. | 700/292 |
| 6,907,381 | B2 * | 6/2005 | Hayashi et al. | 702/181 |
| 7,050,943 | B2 * | 5/2006 | Kauffman et al. | 702/188 |
| 7,065,471 | B2 * | 6/2006 | Gotoh et al. | 702/183 |
| 2001/0056315 | A1 * | 12/2001 | Nagafuchi et al. | 700/286 |
| 2002/0077711 | A1 * | 6/2002 | Nixon et al. | 700/51 |
| 2002/0120412 | A1 * | 8/2002 | Hayashi et al. | 702/61 |
| 2002/0123870 | A1 * | 9/2002 | Chan et al. | 703/7 |
| 2002/0147506 | A1 * | 10/2002 | Eryurek et al. | 700/28 |
| 2003/0000199 | A1 * | 1/2003 | Nagafuchi et al. | 60/39.24 |
| 2003/0004659 | A1 * | 1/2003 | Hayashi et al. | 702/60 |
| 2003/0105544 | A1 * | 6/2003 | Kauffman et al. | 700/109 |
| 2003/0120402 | A1 * | 6/2003 | Jaw | 701/29 |
| 2004/0148132 | A1 * | 7/2004 | Hayashi et al. | 702/184 |
| 2004/0181369 | A1 * | 9/2004 | Hayashi et al. | 702/184 |
| 2004/0184203 | A1 * | 9/2004 | Nagafuchi et al. | 361/20 |
| 2004/0254684 | A1 * | 12/2004 | Nagafuchi et al. | 700/286 |
| 2005/0096873 | A1 * | 5/2005 | Klein | 702/184 |
| 2006/0025936 | A1 * | 2/2006 | Plotts et al. | 702/34 |

* cited by examiner

*Primary Examiner*—Manuel L. Barbee

(57) ABSTRACT

The claimed invention is a method for determining a relationship between a metal temperature of a turbine component and an operating condition of a turbine housing the component. The claimed invention is also a method for determining consumed operating life for a turbine component. The invention further comprises a system for determining an amount of remaining useful life in a turbine component. The invention further comprises a method for determining a relationship between a stress state of a turbine component and an operating condition of a turbine housing the component.

24 Claims, 3 Drawing Sheets

ENGINE COMPONENT LIFE MONITORING SYSTEM AND METHOD FOR DETERMINING REMAINING USEFUL COMPONENT LIFE

FIELD OF THE INVENTION

The present invention relates generally to the field of component life prediction, assessment, and evaluation of turbine components. In particular, to turbine components such as turbine blades, turbine vanes, and combustion elements.

BACKGROUND OF THE INVENTION

Gas turbine engines are known to include a compressor section for supplying a flow of compressed combustion air, a combustor section for burning fuel in the compressed combustion air, and a turbine section for extracting thermal energy from the combustion air and converting that energy into mechanical energy in the form of a rotating shaft.

Modern high efficiency combustion turbines have firing temperatures that exceed about 1,000° C., and even higher firing temperatures are expected as the demand for more efficient engines continues. Many components that form the "hot gas path" combustor and turbine sections are directly exposed to aggressive hot combustion gasses, for example, the combustor liner, the transition duct between the combustor and turbine sections, and the turbine stationary vanes and rotating blades and surrounding ring segments. In addition to thermal stresses, these and other components are also exposed to mechanical stresses and loads that further wear on the components.

Furthermore, many of the cobalt and nickel based super-alloy materials traditionally used to fabricate the majority of combustion turbine components used in the hot gas path section of the combustion turbine engine must be aggressively cooled and/or insulated from the hot gas flow in order to survive long term operation in this aggressive high temperature combustion environment.

Notwithstanding these protective efforts, the combustion turbine components nonetheless tend to suffer operational damage such as thermal fatigue, oxidation, corrosion, creep, foreign object damage, and the like, which typically causes cracking and spallation of the super-alloy substrate and/or protective ceramic coating. Since these high temperature resistant components are quite expensive, it is often desirable to repair or refurbish parts in order to extend their useful life.

SUMMARY OF THE INVENTION

One aspect of the invention involves a method for determining a relationship between a metal temperature of a turbine component and an operating condition of a turbine housing the component, comprising: develop a thermal model of the turbine component, measure a plurality of turbine operating parameters for a period of time, reduce the number of operating parameters, develop an operating history by reviewing the operating parameters for the turbine, identify a damage mechanism to be evaluated for the turbine component based on the turbine operating history, develop an algorithm based on the operating parameters to approximate the component metal temperature, develop rule sets of algorithms, and determine the component metal temperature.

Another aspect of the invention involves a method for determining consumed operating life for a turbine component, comprising recording a plurality of engine operating parameters for the turbine during a period of time, calculating a component condition estimate based upon the recorded parameters for the period of time, evaluating a damage mechanism of the component, obtaining the turbine parameters necessary to determine a life consumption for the damage mechanism based on the calculated condition estimates, calculating a damage fraction for each damage mechanism using the turbine parameters, summing the calculated damage fractions, obtaining the amount of component life remaining based upon the cumulated damage fractions, and working the component based on the amount of component life remaining.

Yet another aspect of the invention involves a system for determining an amount of remaining useful life in a turbine component, comprising a turbine engine monitoring device, an algorithm for determining the component metal temperature, and an algorithm for determining a component damage fraction.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE INVENTION

The invention described herein employs several basic concepts. For example, one concept relates to a method of estimating the remaining useful life of a turbine component. Another concept relates to a method for determining a relationship between engine operating parameters and component temperature. Another concept relates to using the method of estimating remaining useful component life as a predictor for component replacement, refurbishment, or repair. Another concept relates to the calculation of the metal temperature for a turbine component.

The present invention is disclosed in context of use as a method for determining a consumed amount of useful life of a turbine component operated in a turbine, re-entry vehicle, furnaces, and the like. The principles of the present invention are not limited to use within a steam or gas turbine or for determining the consumed useful life of a turbine component. For example, this method could be used in other high temperature and non high temperature environments to determine the amount of component useful life consumed, such as chemical propellant rockets, internal combustion engines, and the like. One skilled in the art may find additional applications for the apparatus, processes, systems, components, configurations, methods and applications disclosed herein. Thus, the illustration and description of the present invention, in context of an exemplary method for determining the consumed useful operating life of a turbine component is merely one possible application of the present invention. However, the present invention has particular applicability for use as a method for determining the consumed useful operating life of a gas turbine blade, vane, or combustor component without destructive analysis techniques.

Figure 1:
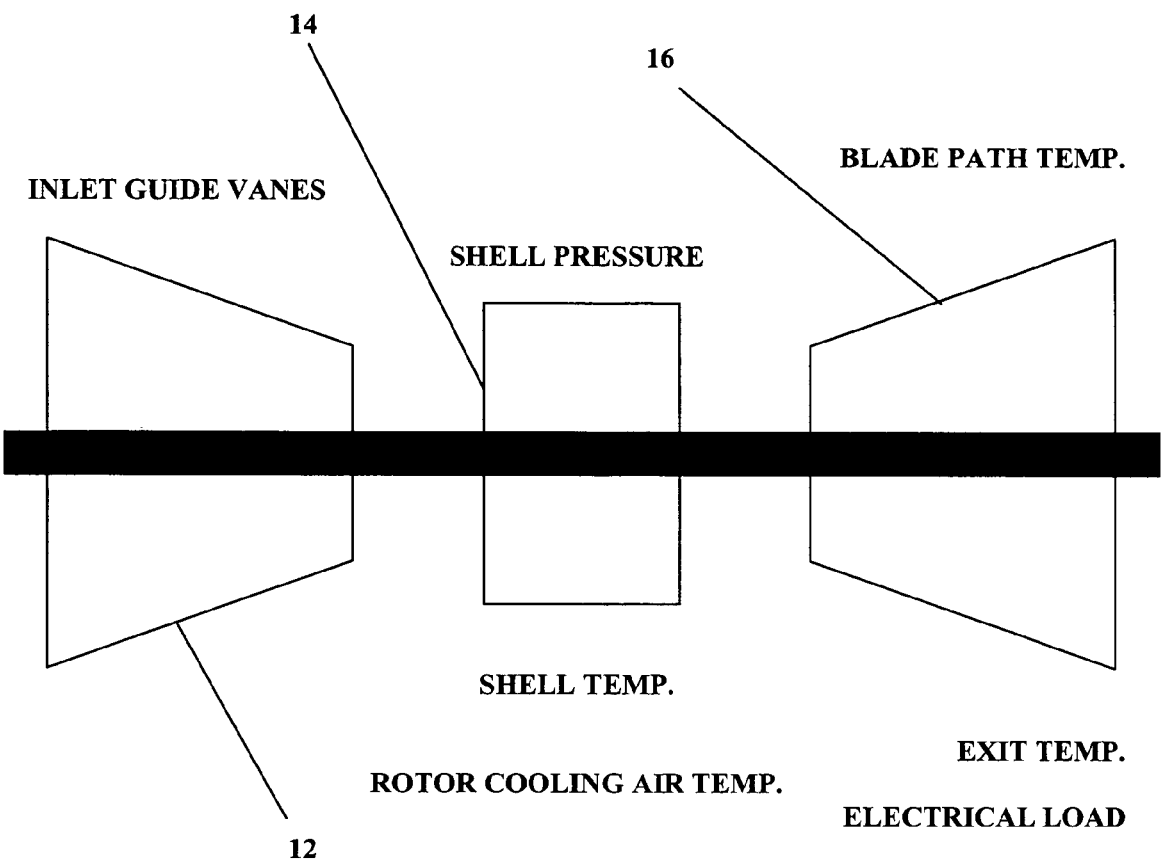
FIG. 1 is a schematic drawing of a conventional turbine.

Referring to FIG. 1, an exemplary schematic diagram of a gas turbine engine 10 and engine operating parameters. A typical gas turbine is comprised of a compressor section 12, a combustor section 14, and a turbine section 16.

A plurality of engine operating parameters have also been considered. The operating parameters are collected via engine monitoring. However, there may be engine parameters to be collected that will necessitate additional instrumentation of the engine. The engine parameters are used in the determination of component metal temperature and determination of stress pairs for a fatigue calculation.

It is not necessary that all of the operating parameters discussed above will be used for the calculation of metal temperature for a given component. There may be situations where a select subset of parameters are only required to calculate component metal temperature. The method of metal temperature calculation is discussed in more detail below. All of the parameters are temporal and may change as a result of the operating condition.

More specifically, the operating parameters collected are shell temperature, shell pressure, blade path temperature, inlet guide vane setting, rotor air cooling temperature, and exhaust gas exit temperature, and the like. Shell temperature is known to be the average shell temperature at a specific operating condition in the combustor chamber 14. Shell pressure is known as the pressure inside the combustion chamber cylinder 14. Exhaust temperature is the average temperature of the exhaust gas exiting the turbine 16. Blade path temperature refers to the average temperature as measured by a thermocouple rake located further downstream from the location where exhaust temperature is measured. Rotor air cooling temperature is average air temperature at the compressor 12 exit. Inlet guide vane setting refers to the orientation of the guide vanes located upstream of the compressor section 12.

Figure 2:
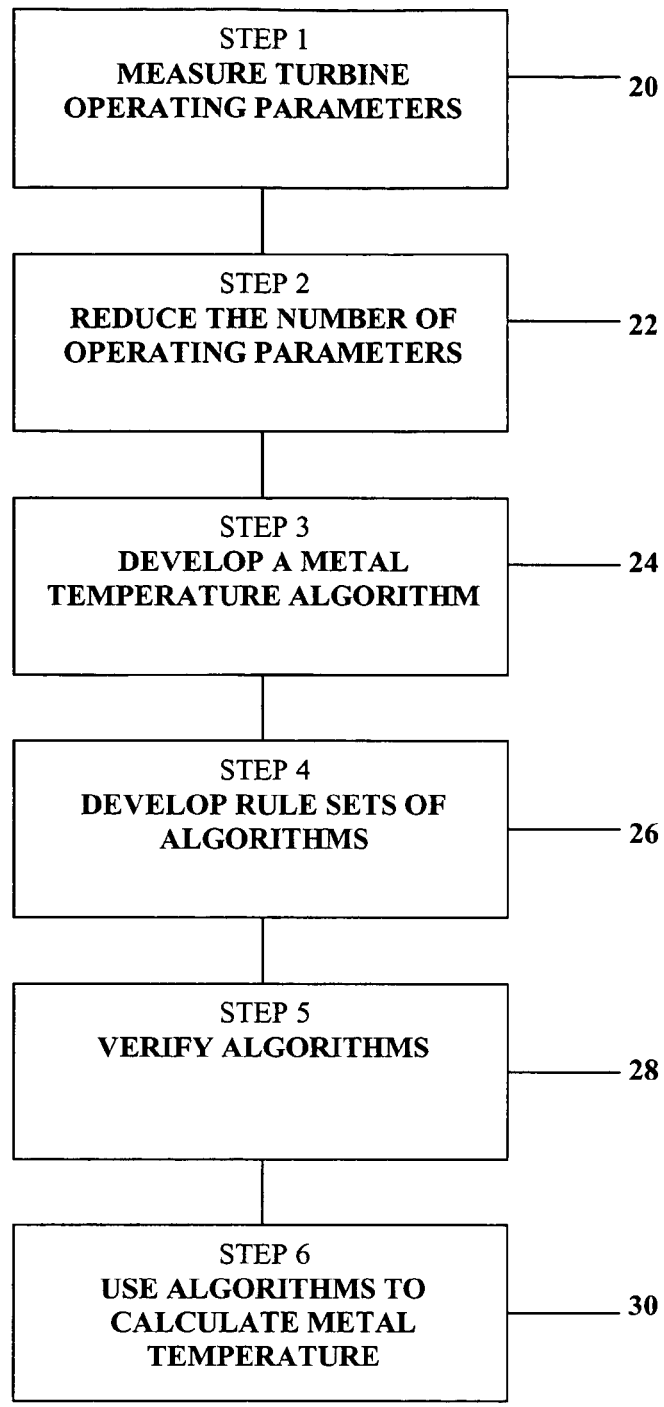
FIG. 2 is a flowchart diagram of an exemplary method for calculating the metal temperature of a component.

Referring now to FIG. 2 showing an illustration for a method to determine turbine component metal temperature. Baseline component metal temperature is determined via experimental and analytical means. The method of remaining useful life of a component discussed below is dependent on component metal temperature and it is therefore helpful to obtain as accurate of a metal temperature as possible. Additionally, it has been shown that the amount of component life spent is largely a function of a path dependency of the metal temperature and time. This can be seen in patent application 2004E13019US, filed on Jun. 30, 2004. Incorporating the effect of path dependency on the calculation of remaining useful life of a turbine component can be incorporated into the design of future components.

When available, it is most desirable to have thermal measurements of each particular turbine component to use as a baseline for metal temperature algorithm development. Two possible ways of obtaining thermal measurements of the components are through field testing of the component or laboratory testing. If no field or laboratory test data is available, analytical models may be used to obtain metal temperatures. Analytical models include finite element models, parametric models, and computational fluid dynamic models. Other methods are available but are not discussed.

In Step 1 of the method, illustrated as item 20, useable operating parameter data is obtained from the operating turbine. Useable data refers to data that can be used as input to sufficiently develop a metal temperature algorithm. The data can be gathered during a specified period of time and over a specified operating range. In the preferred embodiment, the specified period of time is a 24 hour period. This is partly due to the large volume of useable data being retrieved and limited by data storage capabilities. However, there is no requirement that the specified period of time be 24 hours and can be any period of time that is acceptable. The specified period of time may be greater than 24 hours or less than 24 hours.

Preferably, the data collected will include turbine operation at the at interest points of the turbine cycle. At interest points are understood to be regions of turbine operation where there are rapid changes in component temperature or component load during a period of time. Rapid changes are changes that may occur more quickly and generally occur during non steady state operation. For example, at interest points in the turbine operating cycle may be normal turbine start-up, normal turbine shut-down, forced shut-down, swings in the turbine load from high load to low load, swings in turbine load from low load to high load, transient conditions, and surge conditions. Other at interest points can be used and would be understood by one skilled in the art. Data collection at the at interest points are helpful for proper metal temperature calculation during transient operating conditions and generally contribute to the reduction of useful component life because of the high thermal stresses produced.

Metal temperature is preferably calculated at a point of interest on a component. For example, a point of interest may be the location where the peak temperature occurs. As another example, a point of interest may be where the highest strain or stress is located in the component. Generally, the point of interest will be the location on the component where useful life is being depleted most rapidly.

In step 2 of the method, illustrated as item 22, the number of parameters collected (i.e. useable operating parameter data) is reduced, if necessary. Present day industrial gas turbines often collect a plurality of operating parameters via a monitoring system and some of the parameters collected will not be used in the calculation of the metal temperature of the component. Generally, the parameters will be grouped by turbine component. There may be a group of parameters that are necessary for the metal temperature calculation of a particular turbine component and not necessary for a different turbine component. For example, components in the forward portion of the turbine near the combustor may have internal cooling and be coated with a ceramic coating. The parameters necessary for the metal temperature calculation of a cooled, coated part may be different that those necessary for the metal temperature calculation of an un-cooled, un-coated component. It is understood that all of parameters collected may be used for metal temperature calculation and no reduction will be necessary.

Step 3, illustrated as item 24, illustrates the development of a metal temperature algorithm. The metal temperature algorithm is based on the engine operating parameters. It is preferable that the algorithm be simple, repeatable, sensible, and applicable. By simple, the algorithm should have as few inputs as possible where each input may be one or more of the collected operating parameters. A simple algorithm is likely to be stable and well behaved in computational terms. Well behaved computational algorithms would not contain singularities or undefined regions, for example. A second preferred characteristic of the algorithm is repeatability. Repeatability means that the same coefficients are achieved with different sets of engine data. The algorithm is preferably sensible. That is, the metal temperature correlations or calculations should be based only on parameters that have a known relationship to the correlated parameter. The algorithm is preferably applicable meaning that when correlations are applied to data not used in the creation of the algorithm, the standard error and fit should be within acceptable limits. Acceptable limits may be as great as $R^2 > 0.95$. The algorithms are preferably used for interpolation rather than extrapolation. This is because of the nonlinear nature of component metal temperature as a function of engine operation. However, it is not necessary that the metal temperature algorithms be used only for interpolation and may be used for extrapolation of temperatures. It is preferable that if the algorithms are used for extrapolating information that the algorithms adhere to the criteria discussed above. Namely, for extrapolation purposes, the algorithms are preferably simple, repeatable, sensible, and applicable. The metal temperature algorithm will be used for the calculation of component metal temperature during the specified time period or collection period and a metal temperature will be calculated for a specific time increment. The time increment is a specific subdivision of the time period. For example, if the time period is 24 hours, a time increment may be one minute. It is not necessary that the time increment be constant during the time period.

As illustrated in step 4, item 26, rule sets of algorithms are developed. Rule sets of algorithms are families or groups of algorithms that may be used. For example, there may be a group of algorithms developed for the determination of metal temperatures of components at a point of interest. As another example, there may be groups of algorithms that determine the stress of strain of a component during a given period of time at a point of interest.

Once the metal temperature algorithms are developed, the algorithms are preferably verified. Step 5, item 28 of the preferred embodiment illustrates the verification of the algorithms for metal temperature. The useable data collected in step 1, item 20 is evaluated by the algorithm and metal temperature of the component may be calculated. The algorithms may be verified by making a comparison of the metal temperatures calculated via the algorithms to baseline metal temperatures that have either been obtained experimentally or analytically. The calculated metal temperatures are compared to the baseline metal temperatures over the range of collected useable data. At interest points in the cycle should be checked for acceptable limits of deviation. Acceptable limits of deviation for calculated metal temperature to baseline metal temperature will be less than approximately +/−10%. However, depending on the application, the acceptable limit may be greater than +/−10%.

The algorithms may be released for use, as illustrated in step 6, item 30, if the deviation in metal temperature between calculated metal temperature using the algorithms and baseline metal temperature is acceptable. If not, return to step 2, item 22 and refine the algorithm until the algorithm is satisfactory.

For exemplary purposes only, a typical algorithm for the calculation of the vane 1 metal temperature may be illustrated by the following relation:

$$TMV1 = K1 + K2*BPAVG - K3*IGV + K4*SHELL,$$

where TMV1 is defined as metal temperature for vane 1, BPAVG is the blade path average temperature, IGV is the inlet guide position vane, SHELL is the shell pressure, and K, K2, K3, and K4 are constants.

Figure 3:
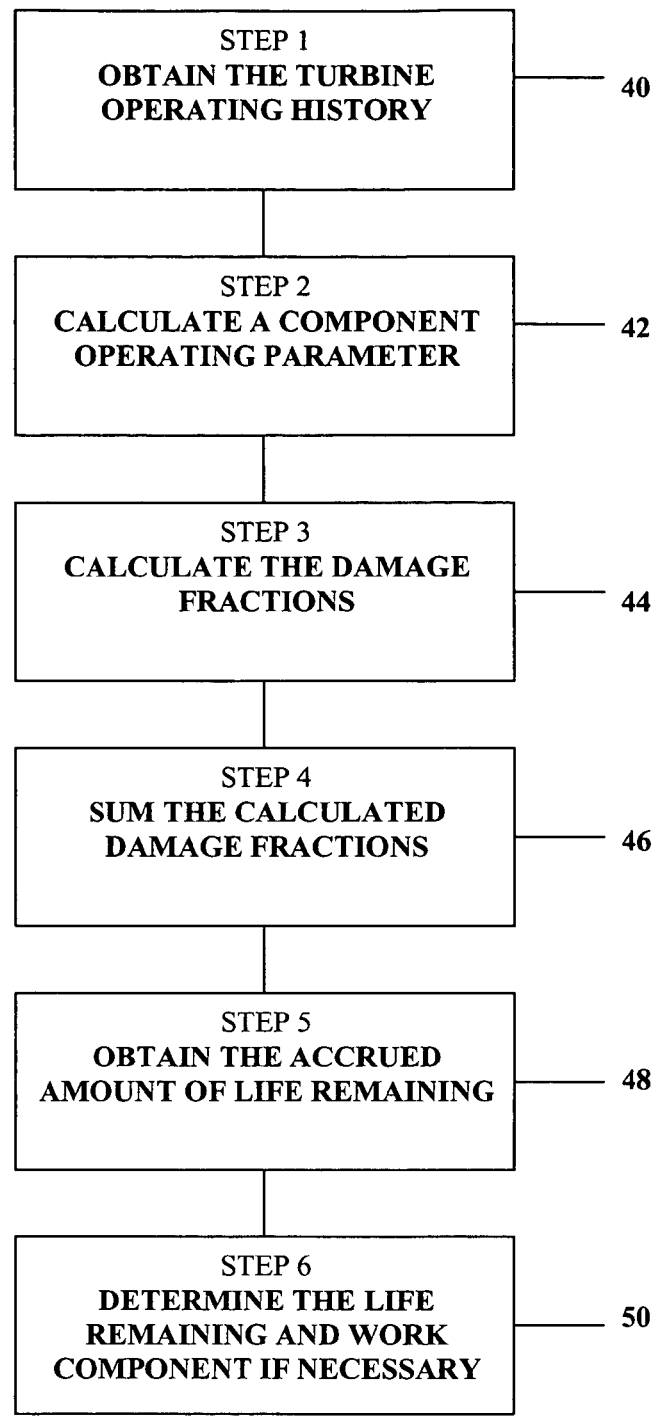
FIG. 3 is a flowchart diagram of an exemplary method for determining the amount of useful life remaining for a turbine component based upon the calculated metal temperature.

Referring now to FIG. 3, the method for determining remaining useful component life is discussed. For a turbine component in a particular turbine operation regime, the component may be exposed to different damage mechanisms. For example, if the component is exposed to a continuous, approximately constant elevated temperature to the extent that the component metal temperature is at, or above the creep limits of the material, the component will experience creep damage. Likewise, if the component is operated in such a manner that it is cycled continuously over a duration of time from low temperature to high temperature to low temperature, low load to high load to low load, or in combinations thereof, the component may experience low cycle fatigue (LCF) damage. Other damage mechanisms are possible and would be known by one skilled in the art.

The damage mechanisms presently incorporated in the claimed invention include LCF damage, thermal barrier coating (TBC) spallation, and bond coat corrosion resistance. However, other damage mechanisms are currently being evaluated and are planned for inclusion into the process. The method illustrated in FIG. 3 will not change with the addition of further damage mechanisms. Additional damage mechanisms include models for creep, erosion, thermo-mechanical fatigue (TMF), and crack propagation. As will be recognized by one skilled in the art, any damage mechanism that can be sufficiently modeled may be included in the method illustrated in FIG. 3 and is not limited to those damage mechanisms previously listed.

As illustrated in step 1, item 40, the turbine operating history is obtained. The turbine operating history can be obtained real time, near real time, or stored in a database for later retrieval. Real time is defined a within 1 second of having occurred. Near real time is not real time. The engine operating parameters collected will be the same parameters collected and used for the determination of the metal temperature algorithms. As mentioned previously, the operating history may be represented by turbine operation during a specific period of time. In the preferred embodiment, operating history would be collected in 24 hour period of time. For example, after a 24 hour period has transpired, data collection would cease for that period and analysis or post processing of the data may occur. Analysis or post processing may include removal of the useful operating parameters from the 24 hour operating history. While the data is being post processed, a new operating history data file would be collected.

From the history collected in step 1, item 40, a pre-determined correlation or algorithm is used to provide a condition estimate that is used in the component damage calculation. This is illustrated as step 2, item 42. Because of the different damage mechanisms incorporated in the preferred embodiment, the condition estimate may be different for a particular damage mechanism. For example, the condition estimate may be the calculation of metal temperature. Metal temperature may be used to determine damage due to TBC spallation. As another example, the condition estimate may be a stress pair. Stress pairs may be used as part of an LCF damage calculation. Stress pair calculation is also partially dependant on metal temperature. Although not included in the preferred embodiment, data sets of the condition estimates may be developed.

As illustrated in step 3, item 44, the damage fraction is calculated. Damage fraction calculation is component specific and damage mechanism specific. For example, the damage fraction for TBC spallation may be calculated by dividing the time period or the time increment by the calculated TBC life. TBC life may be calculated using empirical correlations that are a function of component metal temperature. As another example, a damage fraction for LCF damage may be calculated by a method similar to that used to calculate damage fraction for TBC spallation.

Step 4, item 46 illustrates the summation of damages fractions. Damage fractions may be calculated for each time increment during the time period and for each damage mechanism present. Damage fractions for each damage mechanism are summed for the given time period. The result will be a total estimate of the component damage for each time period.

As illustrated in step 5, item 48, any prior history or prior component damage for the component is retrieved. The calculated component damage may be added to the retrieved component history giving a cumulative damage for the component. Although not illustrated in the preferred embodiment, the prior history or prior component damage may be stored and retrieved from a database. As component for each time period is processed, it may be added to the stored damage history for the component. It is preferable that the damage be connected to the component via a component tracking number. The component tracking number may be a unique number assigned to each component in the turbine or fleet of turbine. This will comprise the operating history for the component.

Illustrated in step 6, item 50, an estimate of component life remaining or part damage may be made. The component part damage may be obtained from the combination of the total damage for each damage mechanism for the component. A determination may be made whether to replace the component, refurbish the component, or take no action depending on the total amount of damage accumulated. Life limits based on the cumulated damage may also be established and remaining useful life of the component determined.

For exemplary purposes, damage fraction calculation and remaining component life for LCF may be accomplished as follows. Initially, a correlation for metal temperature using the measured engine data during a specified period is created (FIG. 3, step 1). A correlation for the condition estimate is determined (FIG. 3, step 2). For LCF, the condition estimates may be component stress and calculated metal temperature. A data set of part stress and metal temperature for the specified time period is developed (FIG. 3, step 2). Using the rain-flow method (previously discussed) of cycle pairing, stress pairs are determined (FIG. 3, step 2). Stress pairs consist of matched changes in stress. For example, a stress change increasing in value would be a stress pair or a stress change decreasing in value would be a stress pair. Additional methods for determining stress pairs would be known by one skilled in the art and are available through the American Society of Testing and Materials (ASTM). Calculate the damage fraction of each stress pair (FIG. 3, step 3). The damage fractions during the specified time period are summed to calculate life usage (FIG. 3, step 4). Life usage, in cycles, for each stress pair is a function of several variables including R ratio, metal temperature, and the maximum stress of stress pairs. R-ratio is the ratio of minimum stress to maximum stress. Miner's rule may be applied to obtain the damage fraction. Miner's rule states that the damage fraction for a single cycle may be obtained by dividing a single stress cycle by a calculated LCF life. With the damage fractions summed for the specified period of time, prior component history may be retrieved (FIG. 3, step 5). Combine the summed damage for the specified period of time with the prior component damage to obtain an accrued component damage giving remaining useful life (FIG. 3, step 6).

While the preferred embodiments of the present invention have been shown and described herein, it will be obvious that such embodiments are provided by way of example only. Numerous variations, changes and substitutions will occur to those of skill in the art without departing from the invention herein. Also, one or more aspects or features of one or more embodiments or examples of the present invention may be used or combined with one or more other embodiments or examples of the present invention. Accordingly, it is intended that the invention be limited only by the spirit and scope of the appended claims.

We claim as our invention:

1. A method for determining a relationship between a metal temperature of a turbine component and an operating condition of a turbine housing the component, comprising:
    develop a thermal model of the turbine component;
    measure a plurality of turbine operating parameters for a period of time;
    reduce the number of operating parameters;
    develop an operating history by reviewing the operating parameters for the turbine;
    identify a damage mechanism to be evaluated for the turbine component based on the turbine operating history;
    develop an algorithm based on the operating parameters to approximate the component metal temperature;
    develop rule sets of algorithms; and
    use the rule sets of algorithms to determine the turbine component metal tempemture so the component metal temperature is humanly perceptible.

2. The method as claimed in claim 1, wherein the algorithm to calculate metal temperature has as few inputs as possible to reliably repeat component temperature calculation.

3. The method as claimed in claim 1, wherein the relationship between metal temperature and turbine operating conditions is determined real time.

4. The method as claimed in claim 1, wherein the relationship between metal temperature and turbine operating conditions is determined non real time.

5. The method as claimed in claim 1, wherein the turbine operating parameters include: shell pressure, blade path exit temp, turbine mass flow rate, compressor inlet guide vane setting, electrical load, and combinations thereof.

6. The method as claimed in claim 1, wherein the damage mechanism is selected from the group consisting of: low cycle fatigue, high cycle fatigue, thermo-mechanical fatigue, and combinations thereof.

7. The method as claimed in claim 1, wherein the period of time is a 24 hour period of time.

8. The method as claimed in claim 1, wherein the metal temperature calculation algorithm calculates a repeatable component metal temperature for the same set of turbine operating conditions.

9. The method as claimed in claim 1, wherein the metal temperature is calculated at a location on the component where the temperature is greatest.

10. The method as claimed in claim 1, wherein the metal temperature is calculated at a location on the component that corresponds to the location where the damage fraction for the damage mechanism will be greatest.

11. The method as claimed in claim 1, wherein the component is a coated turbine component.

12. The method as claimed in claim 1, wherein the damage mechanism to be evaluated depends on the operating history the engine has experienced.

13. The method as claimed in claim 1, wherein a component life curve is developed that correlates the component life as a function of the component metal temperature for a specific damage mechanism.

14. The method as claimed in claim 13, wherein the component feature is a component serial number.

15. The method as claimed in claim 1, wherein the component is tracked per an identifiable feature of the part.

16. A method for determining consumed operating life for a turbine component, comprising:
    recording a plurality of engine operating parameters for the turbine during a period of time;
    calculating a component temperature estimate based upon the recorded parameters for the period of time, using a method that calculates a relationship between the component temperature and the recorded plurality of engine operating parameter, comprising:
        developing a thermal model of the turbine component;
        reducing the number of operating parameters;
        developing an operating history by reviewing the operating parameters for the turbine;
        identifying a damage mechanism to be evaluated for the turbine component based on the turbine operating history;
        developing an algorithm based on the operating parameters to approximate the component metal temperature;
        developing rule sets of algorithms;
        using the rule sets of algorithms to determine the component metal temperature;
    evaluating a damage mechanism of the component;
    obtaining the turbine parameters necessary to determine a life consumption for the damage mechanism based on the calculated condition estimates;
    calculating a damage fraction for each damage mechanism using the turbine parameters;
    summing the calculated damage fractions;
    obtaining the amount of component life remaining based upon the cumulated damage fractions; and
    working the component based on the amount of component life remaining.

17. The method as claimed in claim 16, wherein the cumulated damage fraction is used as an indicator to determine when to remove the component from service.

18. The method as claimed in claim 16, wherein the cumulated damage fraction is to determine when to refurbish the component and return to service.

19. The method as claimed in claim 16, wherein if the component is replaced a component damage history is reset to a given value.

20. The method as claimed in claim 16, wherein if the component is refurbished the component damage history is reset or continued.

21. The method as claimed in claim 16, wherein component damage is tacked via a component serial number.

22. The method as claimed in claim 16, wherein the condition estimate is component metal temperature or component stress pairs.

23. A system for determining an amount of remaining useful life in a turbine component comprising:
    a turbine engine monitoring device;
    an algorithm for determining the component metal temperature, the algorithm comprising the steps of:
        develop a thermal model of the turbine component;
        measure a plurality of turbine operating parameters for a period of time;
        reduce the number of operating parameters;
        develop an operating history by reviewing the operating parameters for the turbine;
        identify a damage mechanism to be evaluated for the turbine component based on the turbine operating history;
        develop an algorithm based on the operating parameters to approximate the component metal temperature;
        develop rule sets of algorithms;
        use the rule sets of algorithms to determine the component metal temperature; and an algorithm for determining a component damage fraction.

24. The system as claimed in claim 23, wherein a storage device is used to store a plurality of collected turbine operating parameters.

* * * * *